Patented Apr. 17, 1923.

1,451,758

UNITED STATES PATENT OFFICE.

FRANK G. BREYER AND WILLIAM H. FINKELDEY, OF PALMERTON, PENNSYLVANIA, ASSIGNORS TO THE NEW JERSEY ZINC COMPANY, OF NEW YORK, N. Y., A CORPORATION OF NEW JERSEY.

MANUFACTURE OF DRY-BATTERY CANS.

No Drawing. Application filed January 12, 1922. Serial No. 528,865.

*To all whom it may concern:*

Be it known that we, FRANK G. BREYER and WILLIAM H. FINKELDEY, citizens of the United States, residing at Palmerton, county of Carbon, State of Pennsylvania, have invented certain new and useful Improvements in the Manufacture of Dry-Battery Cans; and we do hereby declare the following to be a full, clear, and exact description of the invention, such as will enable others skilled in the art to which it appertains to make and use the same.

This invention relates to the manufacture of zinc cans or containers for dry cells or batteries, and has for its object the provision of certain improvements in the manufacture of such zinc cans or containers. More particularly, the invention aims to provide such improvements in the manufacture of zinc cans or containers for dry batteries that substantially uniform corrosion of the zinc takes place in the normal action of the battery.

Considerable difficulty has heretofore been experienced by manufacturers of dry batteries in the uneven corrosion and pitting of the zinc cans or containers of dry batteries. Dry cells or dry batteries, such as the small battery for flash lights and the larger six-inch dry battery, are made up of a zinc can (which serves as the negative battery electrode), a carbon element (which serves as the positive battery element) and an electrolyte confined in the can in the space between and in contact with the carbon element and the zinc can. The electrical energy in a dry battery is secured as a result of the chemical reaction between these elements and involves a solution of the zinc by the electrolyte of the battery. Under conditions of perfect corrosion, the walls of the zinc can or container become thinner and thinner as the battery is discharged and the zinc is dissolved by the electrolyte. In order to produce a given quantity of electrical energy a definite amount of zinc must be dissolved. Where, in the normal action of the dry battery, the corrosion of the zinc container is not uniform, the solution or corrosion of the zinc is concentrated or localized in certain relatively small areas with the result that the zinc wall is eaten through in places in a very short period of time, thereby producing a battery with the zinc container badly pitted or perforated and thus permitting the liquid electrolyte to leak out. To the battery manufacturer this pitting or perforating of the zinc container is an extremely serious matter since it not only prematurely renders the battery useless for further service shortly after the zinc container becomes perforated, due to the loss of the electrolyte and the consequent drying up of the battery filling, but the escaping electrolyte is also liable to cause serious corrosion of any metal parts with which it comes in contact. In the case of flash-light batteries this latter corrosion is so severe as to often necessitate discarding the entire flash-light casing in conjunction with which the battery is used.

We have discovered that the irregular corrosion and premature perforating of the zinc cans or containers of dry batteries is very largely, if not entirely, due to the presence of a difficultly soluble film of grease or oil tenaciously adhering to the electrolytically active surface of the sheet or strip zinc used in making the battery can. We have found that where the electrolytically active surface of the zinc can or container is covered, in whole or in part, with such a difficultly soluble and tenaciously adhering film of grease or oil, certain areas of the zinc are protected from the action of the electrolyte, so that when the battery is discharged the unprotected (or least unprotected) areas must furnish all the zinc required for the battery reaction. Thus, in the case of a zinc container covered in whole or in part with such a difficultly soluble and tenaciously adhering film of oil or grease a very considerable part of the total area exposed to the electrolyte is insulated and the relatively small uninsulated areas must furnish all of the zinc required for the battery reaction. Under such conditions, we find that the zinc container is eaten through or pitted in a very short period of time with the consequent damage hereinbefore mentioned.

The sheet or strip zinc employed in the manufacture of battery cans is produced by rolling a rectangular shaped zinc casting usually not over two inches in thickness into a long strip or ribbon by passing the casting successively through appropriate rolls the necessary number of times required to produce a sheet of zinc of the desired thickness. It is the general practice in zinc mills to lubricate both the surface of the rolls and the material being rolled throughout the entire rolling procedure. This lubricant is essential to the rolling operation and as a consequence of its use the finished strip or ribbon of zinc is covered with a thin film of the oil or grease lubricant. While variations in the rolling practice and careful use of the lubricant can produce a finished strip which appears to be free from oil or grease, we have, nevertheless, determined that under close observation a thin film of lubricant will almost invariably be found adhering to the surface of the finished rolled sheet metal.

As previously stated, manufacturers of dry batteries have long experienced considerable difficulty from the pitting or perforating of the zinc cans or containers of dry batteries. Various causes of this difficulty have been attributed from time to time, and it has heretofore been the general belief that irregularities, and more particularly impurities, in the sheet zinc material were largely responsible for uneven corrosion. As far as we are aware, it has not heretofore been recognized that uneven corrosion might be due to difficultly soluble films of grease or oil tenaciously adhering to the electrolytically active surface of the zinc container.

As a result of our researches and investigations, we have found that substantially uniform corrosion of the zinc container of a dry battery can be obtained by removing the film of oil or grease unavoidably present on the surface of the sheet material as a consequence of the rolling operation. Thus, we have found that where the rolled sheet zinc material is properly washed and the film of grease or oil thereby removed substantially uniform corrosion of the zinc takes place in the subsequent normal action of the dry battery. Our present invention, accordingly, contemplates washing the zinc material of the battery can and thereby removing the difficultly soluble film of oil or grease tenaciously adhering thereto and thus cleaning the surface thereof to the extent necessary for securing substantially uniform corrosion of the zinc in the normal action of the battery.

We have found that the oil or grease which is particularly harmful in causing pitting of the zinc cans cannot be removed from the surface of the sheet zinc by ordinary washing operations but, on the contrary, scouring with alkaline water solutions, or the like, are required in order to remove such films of oil or grease from the sheet zinc. Some idea of the insolubility and tenacity of these films is obtained by mention of the fact that rapid dipping and plunging up and down in ether or alcohol or both is of little value in removing these grease films from sheet zinc, although ether and alcohol are recognized as excellent solvents for grease and oil. In order to remove from the sheet zinc such difficultly soluble and tenaciously adhering films of grease and oil as we are herein considering, it is necessary to rub the surface of the sheet material with a brush or the like and with considerable pressure.

We find in general that the most difficultly soluble and the most adherent films come from the slightly rancid animal and vegetable oils and it is our belief that the acidity of these oils, especially when the oils are heated to the temperature prevailing during the rolling operation, effects some chemical or other action on the surface of the zinc which permits thorough wetting of such surface by the oil or grease with the consequent tenacious adherence of the oil film to the surface which results from such wetting. Neutral oils in general are far less resistant to the penetration of the battery electrolyte and are also very much more easily dissolved from the surface of the sheet zinc. On the other hand, on account of this very property, neutral oils do not make as good lubricants as do those oils which by some action or other thoroughly wet the surface of the zinc.

The cleaning or washing of the zinc contemplated by the present invention may be effected in any appropriate way for effectively removing from the surface of the zinc such difficultly soluble and tenaciously adhering films of oil or grease as hereinbefore described. For example, we have secured excellent results by scouring or scrubbing (with a brush or cloth) the sheet zinc material with a solution made up of ether and alcohol, preparatory to the shaping and soldering of the battery container. It is to be understood that any suitable solvent for grease or oil may be employed in the washing of the zinc in accordance with the invention, it being remembered that the solvent action alone, unaccompanied by scrubbing or scouring of the zinc, is usually ineffective to remove the difficultly soluble and tenaciously adhering films of oil and grease with which the invention is particularly concerned. The mixture of ether and alcohol, while entirely satisfactory as a grease or oil solvent, is relatively expensive, and in commercial practice, we prefer to use an alkaline washing solution. For example, we have secured excellent results by washing the zinc with a solution containing in each gallon thereof 8 ounces of 58% soda ash (sodium carbonate) and 24 cubic centimeters of 42° Baumé water glass (sodium or potassium silicate). This washing solution we employ at a temperature of about 85 to 90° C.

The washing of the zinc may take place preparatory to the shaping and soldering of the battery cans or after the cans have been fabricated. Where the cleaning is carried out prior to the fabrication of the cans, we have obtained excellent results by first running the sheet or strip zinc through a compartment where it is sprayed with the alkaline washing solution and scoured or scrubbed with brushes. The sheet zinc is next rinsed and then dried and carefully handled to avoid any subsequent contamination of its cleaned surface with grease or oil. The washing of the fabricated zinc cans may, if desired, be effected in a machine similar to a bottle washing machine, in which jets or sprays of the alkaline washing solution are applied to the inside of the can and the interior surface of the can simultaneously scrubbed or scoured by a revolving brush. This washing operation is then followed by rinsing of the can with hot water, preferably also accompanied by brush scrubbing. Where the cans are immediately filled, it will generally be unnecessary to dry them. If it is desired, the cans may be dried by a current of hot air or in any other appropriate manner.

The harmful films of oil and grease which it is the purpose of our present invention to remove from the zinc cannot in all cases be readily detected by the eye, and this is, of course, more particularly true after the zinc has been subjected to a washing operation. We accordingly find it necessary in practice to subject the washed zinc to some appropriate factory test for determining whether or not the grease or oil film has been removed to the extent necessary to insure uniform corrosion of the zinc in the normal action of the battery. It is therefore our practice to take appropriate samples of the washed zinc material and subject the samples to such tests as we have found adapted to this end. If, as a result of these tests, the samples are shown to be sufficiently clean, the lot of material represented by the samples is passed, otherwise the lot of material is rejected and subjected to further washing until it satisfactorily meets the factory tests for clean zinc.

Clean zinc, and by clean zinc we mean zinc freed from the difficultly soluble and tenaciously adhering films of grease and oil hereinbefore described, is readily wetted by pure water. If the samples of washed and cleaned zinc when immersed in pure water are uniformly wet by the water, the zinc is considered satisfactorily cleaned for the purposes of the invention. Another test is to connect a sample of the washed zinc, corresponding in surface area to that of the zinc can of the battery in which the zinc is to be used, as the anode in an electrolytic cell and to pass through the cell such an amount of electrical energy as corresponds to the electrical energy derivable from the corresponding dry battery when discharging. If the zinc material has been properly washed the zinc will be found uniformly corroded after this test. This test requires considerable time and on this account is not entirely suited for factory use. We find the most satisfactory test for factory use to be immersion of the samples of washed zinc in a one-tenth normal solution of silver nitrate. The immersion should be performed quickly, that is, by merely dipping the zinc sample into the solution. If the zinc material has been properly washed, the immersed portion will be uniformly blackened by a deposit of silver thereon and there will be a sharp definite line of demarcation between the immersed and unimmersed portions of the sample. This is a very satisfactory and delicate test and because of the rapidity with which it can be made is well adapted for use in the factory. If the zinc has not been properly washed and cleaned, for the purposes of the invention, the ununiform blackening of the immersed surface of the zinc sample will unmistakably indicate this fact.

In the course of our researches and investigations, we have determined that any film of oil or grease when existing in sufficient thickness on the zinc strip will cause uneven corrosion and final perforation or pitting of the zinc battery can. We have, however, found, as hereinbefore intimated, that certain greases or oils are more harmful in their action in this respect than others, due perhaps to the fact that they are capable of producing by more thorough wetting of the zinc a better adhering and hence more perfect insulating film for any given thickness of film. Our investigations have, nevertheless, demonstrated that a perfectly clean zinc is unquestionably capable of corroding more uniformly than an uncleaned zinc, no matter how thin the oil film or what the character of the oil or grease. In fact, our investigations have clearly demonstrated that clean zinc, substantially free from the difficultly soluble and tenaciously adhering films of oil and grease hereinbefore described, is essential to perfect and uniform corrosion of the zinc container, both in the smaller sized dry cells, such as the flash light batteries, and in the larger dry cells, such as the ordinary six-inch dry batteries.

From the foregoing description, it will be evident that the cleaning of zinc for dry battery manufacture, contemplated by the present invention, represents a distinct improvement in the art of battery making, since it insures to the battery maker a zinc material which will corrode uniformly, thus doing away with pitting or perforation of the zinc can which has heretofore been one of the most serious problems confronting the battery manufacturer. The invention is of particular advantage in the manufacture of zinc cans or containers for dry batteries where the cans are made up of rolled sheet zinc stock appropriately shaped and having a soldered joint. Heretofore it has been customary to make up such zinc cans or containers directly from the rolled stock, without any treatment thereof subsequent to the rolling operation which would remove the difficultly soluble and tenaciously adhering films of grease or oil which, as a result of our researches and investigations, we have found to be the principal, if not the sole, cause of uneven corrosion and premature eating away of the zinc.

In the manufacture of drawn zinc cans for dry batteries, a relatively large amount of a heavy lubricant is used, the use of such lubricant being essential to the drawing operation. After the drawing of these cans, it is customary to remove, in one way or another, the excess of the lubricant employed in the drawing operation. It will, of course, be understood that drawn zinc cans are made from rolled sheet zinc, the surface of which is more or less covered with the difficultly soluble and tenaciously adhering films of oil or grease hereinbefore described as inherently resulting from the rolling operation. The heretofore customary procedures for removing from drawn zinc cans the excess of lubricant employed in the drawing operation as we understand such procedures are not of such a nature as will remove the difficultly soluble and tenaciously adhering films of oil or grease hereinbefore described, and the present invention is accordingly applicable to the washing of drawn zinc cans for the removal therefrom of such difficultly soluble and tenaciously adhering films of oil or grease as are carried thereby as a result of the rolling operation.

We claim:—

1. The improvement in the manufacture of zinc cans for dry batteries which comprises washing the zinc material composing the battery can and thereby cleaning the surface thereof to the extent necessary for securing substantially uniform corrosion of the zinc in the normal action of the battery.

2. The improvement in the manufacture of zinc cans for dry batteries made up of rolled zinc which comprises washing the zinc and removing from its surface the difficultly soluble and tenaciously adhering film of oil or grease acquired as a consequence of the rolling operation and thereby cleaning the surface of the zinc to the extent necessary for securing substantially uniform corrosion of the zinc in the normal action of the battery.

3. The improvement in the manufacture of zinc cans for dry batteries made up of rolled zinc which comprises scrubbing the zinc with an alkaline washing solution and removing from its surface the difficultly soluble and tenaciously adhering film of oil or grease acquired as a consequence of the rolling operation and thereby cleaning the surface of the zinc to the extent necessary for securing substantially uniform corrosion of the zinc in the normal action of the battery.

4. The improvement in the manufacture of zinc cans for dry batteries made up of rolled zinc which comprises washing the zinc and removing from its surface the difficultly soluble and tenaciously adhering film of oil or grease acquired as a consequence of the rolling operation and thereby cleaning the surface of the zinc to the extent necessary for securing substantially uniform corrosion of the zinc in the normal action of the battery, said washing of the zinc being conducted as a preparatory step to the fabrication of the battery can.

5. The improvement in the manufacture of zinc cans for dry batteries made up of rolled zinc appropriately shaped and having a soldered joint which comprises washing the zinc and removing from its surface the difficultly soluble and tenaciously adhering film of oil or grease acquired as a consequence of the rolling operation and thereby cleaning the surface of the zinc to the extent necessary for securing substantially uniform corrosion of the zinc in the normal action of the battery.

6. The improvement in the manufacture of zinc cans for dry batteries which comprises scrubbing rolled zinc with an alkaline washing solution and removing from its surface the difficultly soluble and tenaciously adhering film of oil or grease acquired as a consequence of the rolling operation and thereby cleaning the surface of the zinc to the extent necessary for securing substantially uniform corrosion of the zinc in the normal action of the battery, and then appropriately shaping and soldering the washed zinc for the formation of the battery can.

In testimony whereof we affix our signatures.

FRANK G. BREYER.
WILLIAM H. FINKELDEY.